UNITED STATES PATENT OFFICE.

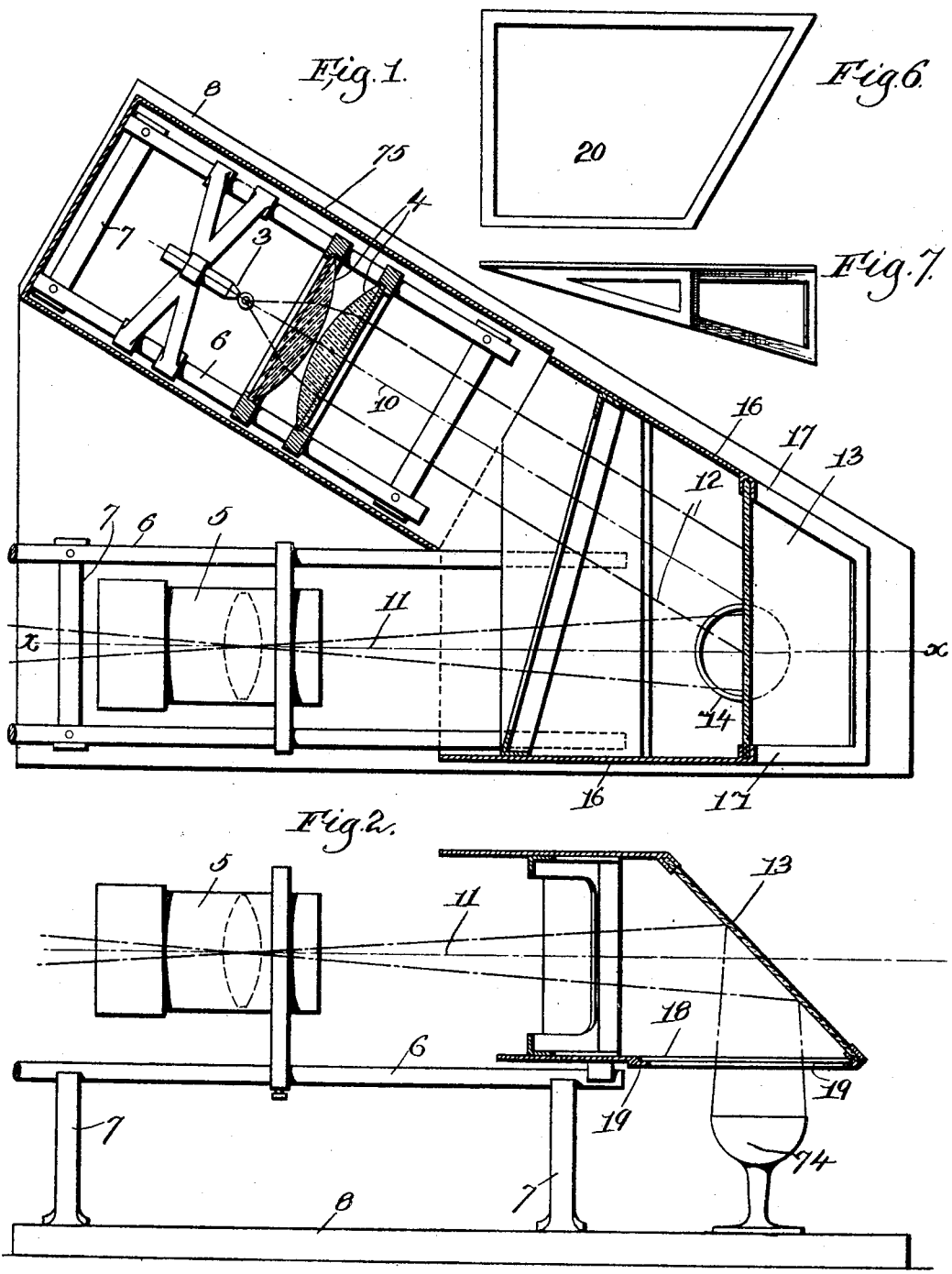

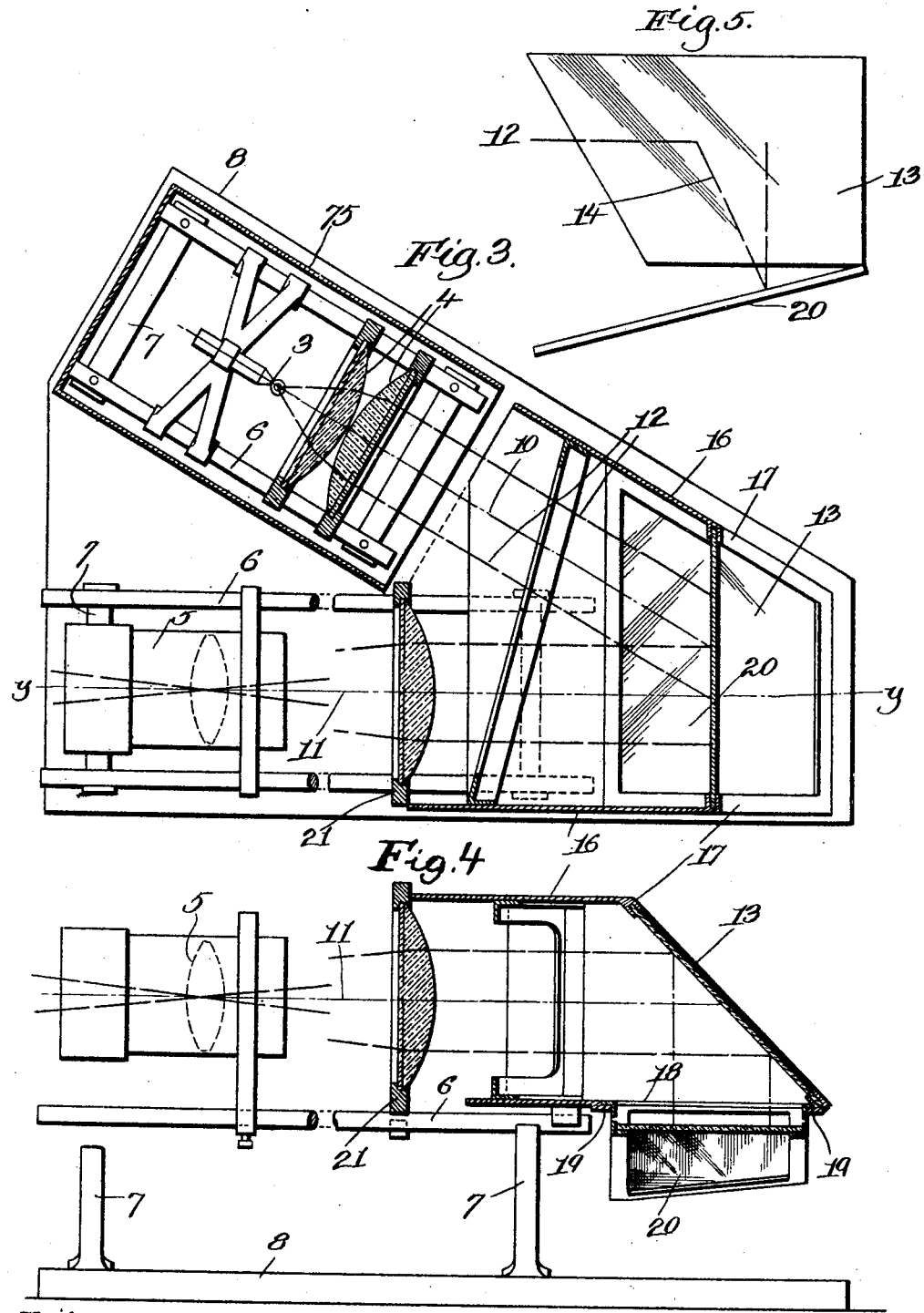

PHILIP HENRY WYNNE, OF BOSTON, MASSACHUSETTS, ASSIGNOR, BY DIRECT AND MESNE ASSIGNMENTS, OF ONE-HALF TO AGNES WYNNE AND ONE-HALF TO L. E. KNOTT APPARATUS COMPANY, OF BOSTON, MASSACHUSETTS, A CORPORATION OF MASSACHUSETTS.

PROJECTION APPARATUS.

No. 803,385.      Specification of Letters Patent.      Patented Oct. 31, 1905.

Application filed July 28, 1905. Serial No. 271,584.

*To all whom it may concern:*

Be it known that I, PHILIP HENRY WYNNE, a citizen of the United States, residing at Boston, county of Suffolk, and State of Massachusetts, have invented an Improvement in Projection Apparatus, of which the following description, in connection with the accompanying drawings, is a specification, like numerals on the drawings representing like parts.

This invention relates to that class of projection apparatus which is designed to project an image either from a transparent object, such as a lantern-slide, or from an opaque object. These two ways of projecting I will refer to for convenience as "transparent" projection and "opaque" projection. In most projection apparatus of this class with which I am familiar the opaque object to be projected is sustained in a vertical plane. While this method of supporting the object is feasible so long as the object is in the nature of a plate or a card, yet it is not practical if the opaque object is of such a character that it cannot be turned out of a horizontal position without destroying or disarranging the view which it is desired to project. For instance, the said method of supporting the object would not be feasible if the view it was desired to project on the screen were one showing the arrangement which iron filings on a sheet of paper will take when a horseshoe-magnet is placed beneath the paper or is any other physical experiment which can only be observed in plan view, because the very act of turning the piece of paper or other apparatus showing the physical experiment into the vertical position would disarrange and destroy the experiment which was to be projected. I have improved this type of apparatus by providing a construction in which the opaque object to be projected may be sustained in a horizontal position, so that it is possible to project almost any object whether it be one which could be readily put into a vertical position, as a card, or one which could not be so placed, as the physical experiment above referred to, or an open vessel containing liquid, &c.

In most projection apparatus the projected image of the opaque object is necessarily a perverted image—that is, an image similar to the image seen in a mirror—unless the projected image is rectified by use of an additional mirror or some equivalent device.

My improved projection apparatus is so constructed that the projected image is an erect one, both inversion and perversion of the image being avoided.

In order to accomplish these objects, I provide means for sustaining the opaque object in a horizontal position and interpose in the path of the beam of light emanating from the source of illumination a mirror so disposed as to reflect said beam onto the opaque object, thereby to illumine said object and then use the same mirror to reflect through the objective those light-rays emanating from the illuminated object which are to be projected on the screen. Said mirror therefore stands in the path of and reflects successively the rays emanating from the source of illumination and those emanating from the illumined object. Since the rays emanating from the illumined object are reflected by the mirror before they pass through the objective, the image which is projected through the objective is a reflected image of the illumined object, and therefore the perversion caused by the reflection in the mirror corrects that caused by the projection on the screen and the image appears on the screen in its correct position. Said mirror therefore performs two functions. First, it reflects the illuminating-rays onto the object and performs the function of an "illuminating-mirror," and, secondly, it reflects the rays radiated from the object and by so doing prevents the perversion of the projected figure, and thereby becomes an "image-erecting" mirror. I shall therefore hereinafter refer to this mirror as a "combined illuminating and erecting mirror."

In order to convert my apparatus from an opaque-projection apparatus to a transparent-projection apparatus, I use a second mirror to coöperate with the illuminating and erecting mirror, said second mirror being so disposed as to receive the reflected illuminating-rays from the first-named mirror and then reflect said rays back to said mirror, said reflected rays being again reflected by the first-named mirror in the direction of the objective. In using the apparatus as thus arranged the transparency to be projected will be placed in the path of the thrice-reflected beam of light, or, in other words, between the combined illuminating and erecting mirror and the objective.

In the drawings which illustrate an apparatus embodying my invention, Figure 1 is a horizontal section through said apparatus when arranged for opaque projection. Fig. 2 is a vertical section on the line $xx$, Fig. 1. Fig. 3 is a view similar to Fig 1, showing the apparatus when arranged for transparent projection. Fig. 4 is a section on line $yy$, Fig. 3. Fig. 5 is a perspective view of two mirrors arranged to show the principle on which my apparatus works. Fig. 6 is a plan view of the frame supporting the mirror 20, and Fig. 7 is a side elevation of Fig. 6.

The source of illumination, the condensing-lens, and the objective-lens may be of any suitable or usual construction, and in order to simplify the drawings I have shown these elements conventionally.

3 designates a source of illumination which is herein illustrated as an arc-light, and 4 designates the usual condensing-lenses which are usually used in this class of apparatus. The objective is designated by 5. These elements are supported in any suitable or usual way upon the optical bed 6, which is shown as supported by stands 7, rising from a bed or table 8.

The center line 10 of the condensing-lenses and the center line 11 of the objective are non-parallel and may have any convenient angular relation to each other. As herein shown, said center lines are arranged to form between them an angle of substantially thirty degrees, although it will be obvious that my invention is not limited to this angle.

Situated in the path of the beam of rays 12, collimated by the condensing-lenses 4, is a mirror 13, which, when the apparatus is used for opaque projection, is a combined illuminating and erecting mirror, as will be presently described. This mirror stands at an inclination of about forty-five degrees to the plane in which the center lines 10 and 11 lie. In this embodiment of my invention said plane is a horizontal plane. With the mirror so placed the beam 12 from the condensing-lens is reflected thereby downwardly, and if an object is placed in a horizontal position beneath said mirror to receive said reflected beam such object will obviously be illuminated by said beam. With my apparatus an opaque object is thus illuminated by reflected rays originally emanating from the source of illumination. The opaque object thus illuminated will obviously radiate light-rays in all directions, and those which strike the mirror 13 in a vertical direction will be reflected in a horizontal line through the objective and thus projected onto the screen. The object which is thus projected is therefore, in fact, the reflection of the object in the mirror 13. In order that the reflected image of the illuminated object which is thus projected on the screen may be readily focused, I prefer to arrange the mirror 13 square onto the center line 11 of the objective-lens, as shown in the drawings, and to so incline the mirror that the rays which emanate vertically from the illuminated object are the ones which are reflected through the objective. This particular arrangement of mirror 13 is not essential, however, although I deem it preferable. The only essential feature is that said mirror shall be so placed as to reflect the collimated rays from the condenser-lens onto the object to be illuminated and then reflect some rays from the object toward the objective.

The mirror 13 may be supported in any usual or suitable way. I have herein shown it as detachably secured to and forming the back side of a casing 16, which is adapted to rest on the optical bed 6, said casing having the proper shape, so that when the mirror is slipped into the ways 17 it stands in the required inclined position. The bottom of the casing 16 is provided with an opening 18 beneath the mirror 13, and the opaque object 74 to be projected may be placed directly on the table 8 or on any suitable support beneath said opening, so as to receive the reflected illuminating-rays. Said casing is also provided with ways 19, in which opaque objects, such as cards, may be slid, or in which any suitable holder supporting an opaque object may be supported.

It will be understood, of course, that all parts of the apparatus are covered by suitable hoods 75.

In order to change my apparatus over into one adapted for transparent projection, I place another mirror 20 beneath the mirror 13 and in position to receive the rays reflected thereby, said mirror 20 being so disposed as to reflect back onto the mirror 13 the reflection of the source of illumination, and I then place the transparent object in a holder 21, interposed between the objective 5 and the mirror 13. With this arrangement of the parts the rays 12 from the condensing-lenses strike the mirror 13 and are reflected thereby down onto the mirror 20, and by this mirror 20 are again reflected onto the mirror 13, and by this mirror 13 still again reflected forward through the transparency in the holder 21 and the objective 5. The illuminating-rays are reflected three times, twice by the mirror 13 and once by the mirror 20; but since these mirrors can be made to reflect substantially all of the rays very little loss of light occurs. By this arrangement of mirrors it is possible to use the same objective for transparent projection as is used for opaque projection, and the change from one to the other does not involve a resetting of the instrument or a change of position of the screen, but simply the placing of a mirror 20 to receive the rays reflected from the mirror 13.

Where the mirror 13 is arranged square with the objective-lens, it is necessary to give the mirror 20 the proper inclination, as shown in the drawings, so that it will reflect the rays back onto the mirror 13.

It will be noted from Figs. 1 and 3 that the rays 12 strike the mirror 13 at an angle, and therefore while each ray is reflected downwardly in a vertical plane owing to the forty-five degree inclination of the mirror 13 said rays are also reflected at an inclination in said vertical plane, as seen in Fig. 5. If the mirror 20 were placed horizontally, each reflected ray 14 would be reflected back again in the same vertical plane, but at an opposite inclination, and would again be reflected by the mirror 13 to one side of the objective; but by properly inclining the mirror 20 the rays 14 are reflected back to the mirror 13 at such an angle that upon being reflected a second time by the mirror 13 they can pass through the objective.

Any suitable holder 21 for the transparent object may be employed, and in order not to confuse the drawings I have illustrated said holder conventionally only.

It will thus be seen that my apparatus comprises in its construction a mirror arranged to reflect the rays emanating from the source of illumination onto an object (whether said object be the opaque object which it is desired to project onto the screen or simply a reflector, such as a mirror 20, to reflect back to the mirror 13 the rays which said reflector receives therefrom) and also to reflect toward the objective the rays emanating from the illumined object. When the device is used as an opaque-projection apparatus, the object is the opaque object which it is desired to project, and when the apparatus is used for transparent projection the object is a reflector which is adapted to reflect back to the mirror 13 the rays which it receives therefrom. By the term "object" therefore, as used to define the article on which the rays from the source of illumination are reflected, I mean either the opaque object to be projected or a reflector.

It will be obvious, of course, that any suitable reflector may be used for the combined illuminating and erecting mirror, and by the term "mirror" I intend to cover any suitable reflector, whether it be silvered glass, polished metal, or of any other suitable construction.

From the above it will be seen that my apparatus is an extremely simple one, but that it accomplishes results not possible with any of the projection apparatus in which the opaque objects to be projected must be sustained in a vertical plane.

Having fully described my invention, what I claim as new, and desire to secure by Letters Patent, is—

1. In a projection apparatus, a source of illumination, an objective-lens, and a combined illuminating and erecting mirror to reflect light from the source of illumination toward an object, and to reflect toward the objective the light which is emanated or reflected from the object.

2. In a projection apparatus, a source of illumination, a condensing-lens, an objective-lens, and a combined illuminating and erecting mirror arranged at an angle of about forty-five degrees to the plane containing the median lines of the condensing-lens and the objective-lens.

3. In a projection apparatus, a source of illumination, an objective-lens, a condensing-lens, means to support an object in a plane parallel to the plane containing the median lines of the condensing-lens and the objective-lens, and a combined illuminating and erecting mirror to reflect light from the source of illumination onto said object and also to reflect light emanating or reflected from the illumined object to the objective.

4. In a projection apparatus, a source of illumination, means to collimate light-rays emanating therefrom and direct them horizontally, an objective-lens, and a reflector to receive the collimated light-rays and reflect them onto an object, said reflector being so disposed as to reflect toward the objective the light emanated or reflected from the object.

5. In a projection apparatus, a source of illumination, a condensing-lens, an objective-lens, a combined illuminating and erecting mirror arranged at an angle of about forty-five degrees to a horizontal plane, and means to support it in position to receive the reflected rays from said illuminating and erecting mirror, said latter mirror also being so positioned as to reflect toward the objective the rays which emanate or are reflected from said object.

6. In a projection apparatus, a source of illumination, an objective-lens, a casing having an open end which is directed toward both the source of illumination and the objective, a combined illuminating and erecting mirror within the casing, and means to support an object to receive the light reflected from said mirror, said mirror being also disposed so as to receive and reflect toward the objective light emanated or reflected from the object.

7. In a projection apparatus, a source of illumination, an objective-lens, a casing having an open end directed toward said source of illumination and objective-lens, a mirror within the casing, said casing having an opening beneath the mirror, and means to support an object beneath said opening, said mirror being so arranged as to reflect onto the object the rays emanating from the illumined object.

8. In a projection apparatus, two optical beds, a source of illumination, and a condensing-lens mounted on one optical bed, an objective-lens mounted on the other optical bed, a casing carried by both beds, said casing having an open end directed toward the source of illumination and the objective-lens and also an opening in its bottom, a mirror above said opening and arranged at forty-five degrees to a horizontal plane and so disposed as to reflect through the opening the rays emanating from the source of illumination, thereby to illuminate an object placed beneath the opening, and also to reflect toward the objective rays emanating from the illumined object.

In testimony whereof I have signed my name to this specification in the presence of two subscribing witnesses.

PHILIP HENRY WYNNE.

Witnesses:
   LOUIS C. SMITH,
   BERTHA F. HEUSER.